E. MATTMAN.
FIELD MAGNET FOR DYNAMO ELECTRIC MACHINES.
APPLICATION FILED JAN. 28, 1907.
949,082.
Patented Feb. 15, 1910.
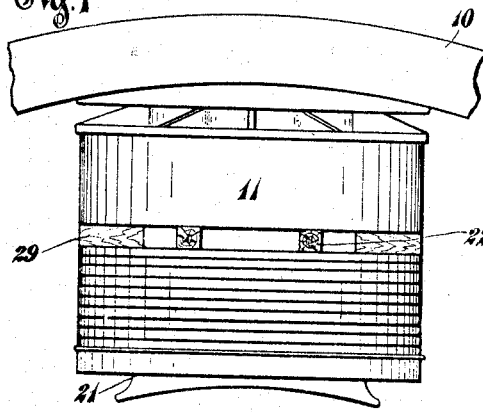
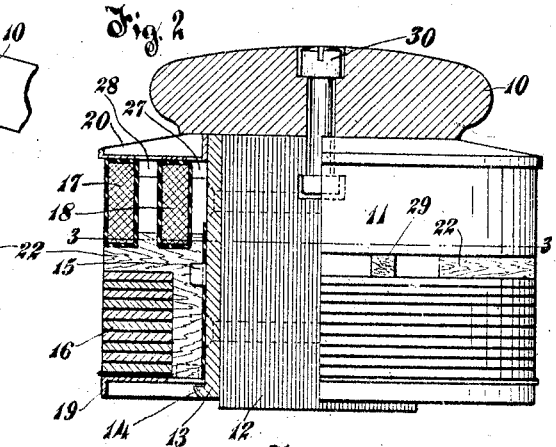
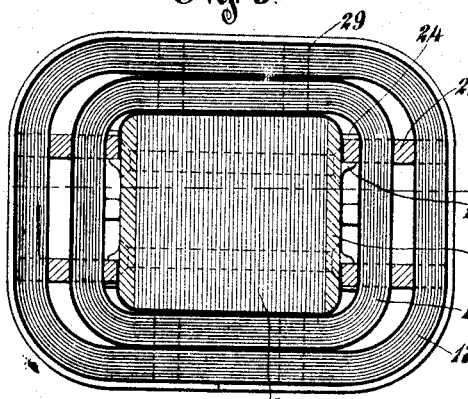
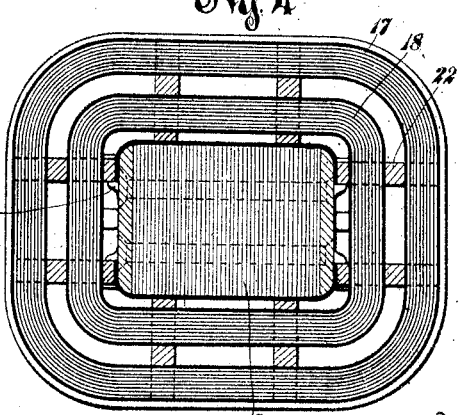
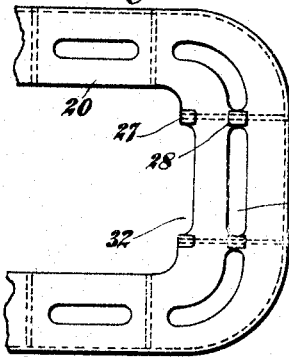
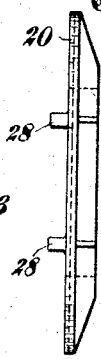
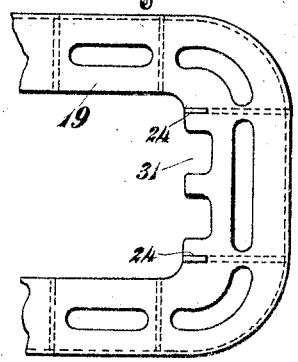
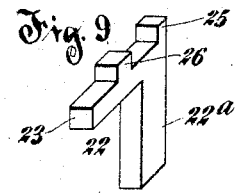
Witnesses
Inventor
Emil Mattman

UNITED STATES PATENT OFFICE.

EMIL MATTMAN, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

FIELD-MAGNET FOR DYNAMO-ELECTRIC MACHINES.

949,082.     Specification of Letters Patent.     Patented Feb. 15, 1910.

Application filed January 28, 1907. Serial No. 354,516.

*To all whom it may concern:*

Be it known that I, EMIL MATTMAN, a citizen of the Republic of Switzerland, residing at Norwood, in the county of Hamilton and State of Ohio, have invented certain new and useful Improvements in Field-Magnets for Dynamo-Electric Machines, of which the following is a full, clear, and exact specification.

My invention relates to dynamo-electric machines and particularly to the structure of the field magnets.

The object of my invention is to provide a field magnet structure which will be well ventilated and which at the same time will be strong, inexpensive and consist of few parts which can be easily made, assembled or taken apart.

With these ends in view my invention consists in the particular arrangement of the coils of the field magnet and in the means for supporting, arranging, and spacing the coils from each other and from the pole, all as will be more fully described in the specification and set forth in the appended claims.

In the drawings Figure 1 is a side elevation of a portion of the field yoke and one of the magnets attached thereto; Fig. 2 is a section through the field yoke, the field magnet being shown partly in section and partly in elevation, the section being taken approximately along the line 2—2 of Fig. 3; Fig. 3 is a section through the field magnet approximately along the line 3—3 of Fig. 2; Fig. 4 is a similar sectional view of a slightly modified form of my invention; Fig. 5 is a partial plan view of the coil seat employed adjacent the yoke; Fig. 6 is an end view of the same; Fig. 7 is a partial plan view of a coil seat employed at the end of the pole remote from the yoke; Fig. 8 is an end view of the same; and Fig. 9 is an isometric view of a spacing member employed in my field magnet structure.

Referring now to the figures of the drawing, 10 represents a portion of the field frame or yoke to which a field magnet 11 is secured. The pole piece 12 of the magnet consists of laminæ which are held between end-heads or plates 13 by a number of rivets shown in dotted lines in Fig. 2. The end-plates 13 are slightly different from the usual construction, each of them having a lug 14 at the center of the end remote from the yoke, and a pair of spaced lugs 15 between such end and the yoke, as shown most clearly in Figs. 2 and 3. The purpose of the lug 14 is to assist in supporting the coil seat at that end of the pole, and the purpose of the lugs 15 is to assist in holding in position the coil spacings and supporting devices, as will be more fully described. The magnet is provided with a series coil 16 and shunt coils 17 and 18, the shunt winding being divided into sections, in this case two in number, to secure better cooling effects. The series coil is arranged adjacent the armature end of the pole piece, and the two shunt coils are arranged concentrically between the series coil and the field yoke. The field magnet is provided with a coil seat 19 on which the series coil rests, and with a coil seat 20 which bears against the yoke and against the shunt coils. Both coil seats are of the cast metal skeleton type, and are provided with ventilating openings to be described later. The coil seat 19 rests upon the pole tips 21 and upon the lugs 14 on the end-plates. The coils are spaced from the pole piece and from each other so as to permit a good circulation of air around and between the coils as will now be described.

In the preferred form of my invention the end portions of the series coil of each magnet are spaced from the ends of the field pole, and the end portions of the shunt coils are spaced from one another, from the ends of the pole, and from the series coil. As is shown most clearly in Figs. 2, 3 and 4, I employ spacing members 22 which are preferably made of wood or other insulating material. These spacing members 22 are substantially L-shaped, each having a portion 22ª extending between the series coil and the pole, and a portion 23 at right angles to the portion 22ª extending between the series coil and the shunt coils, so as to hold the end portions of the coils in position and to provide ventilating spaces. In this instance I employ two of these spacing members at each end of the pole. Each spacing member rests upon the coil seat 19 and against the end-plate of the pole, one side of the lower end of the spacing member bearing against an upwardly extending lug 24 on the coil seat 19 and the other side bearing against one of the lugs 15 on the end-plate, so as to be held more rigidly in position. If desired each spacing member may be further secured to the coil seat 19 by one or more screws. The arm 23 of the spacing member is provided with a pair of spacing projections 25 and 26, which extend respectively between the pole and the inner shunt coil 18, and between the two shunt coils 17 and 18. The shunt coils are also spaced from each other and from the pole by lugs 27 and 28 on the coil seat 20, each lug 27 being of substantially the same width as the projection 25 of the spacing member, and each lug 28 being of substantially the same width as the projection 26 of the spacing member. The sides of the coils in the preferred form of my modification, as shown most clearly in Fig. 3, extend closely along the sides of the pole, the series coil and innermost shunt coil being separated therefrom by sheet insulation 29. The side portions of the series and shunt coils are preferably held the same distance apart as the end portions by insulating strips or blocks 29 shown in Fig. 2 and in dotted lines in Fig. 3.

The coil seat 19 is provided at each end with openings 31 which register with the opening or space between the series coil and the pole, and the coil seat 20 is provided at each end with openings 32 which register with the space between the shunt coil 18 and the end of the pole, and with openings 33 which register with the space between the end portions of the shunt coils 17 and 18.

In assembling the parts the coil seat 19 is first slipped into place from the yoke end of the pole. The series coil and spacing members 22 are next placed in position, the latter being forced down tightly between the coil and the pole, and between the lugs 15 and 24. The shunt coils and the coil seat 20 are next placed on to the pole, after which the magnet can be secured to the field frame by bolts, one of which is shown at 30. When the bolts are tightened the parts of the magnet are clamped very tightly together.

It will be seen that when the machine is in operation a considerable volume of air can pass outward through the end portions of the field magnets, the air passing outward between the series coil and the pole piece, between the series coil and the shunt coils, between the two shunt coils, and between the inner shunt coil and the pole piece. Furthermore the field magnet structure consists of comparatively few parts, which are inexpensive and can be easily assembled or removed from the pole. When the parts are assembled and the field magnet attached to the yoke, all the parts are held rigidly in position, and a durable and solid structure results.

In Fig. 4 I have shown a modification of my invention. In this instance the series and shunt coils are spaced from both the ends and the sides of the pole piece, and the two shunt coils are spaced from each other at all points, so as to form continuous ventilating passageways around the magnet. The same type of spacing members 22 employed in the construction first described are preferably here employed as shown in Fig. 4, two being employed at each end and two at each side of the pole. It will be understood that the coil seats employed in this construction will be of greater width than those shown in Figs. 5 and 7 so as to properly support the sides of the coils. The seats will also be provided with suitable ventilating openings.

I do not desire to be confined to the exact details shown but aim in my claims to cover all modifications which come within the spirit and scope of my invention.

What I claim as new and desire to secure by Letters Patent is:—

1. In a dynamo-electric machine, a field magnet comprising a pole piece, series and shunt coils on the pole piece, said shunt coils being arranged in concentric sections at one end of the series coil, and unitary means spacing the series and shunt coils from the pole piece, the series coil from the shunt coils, and the shunt coils from one another, said spacing means providing open passageways between the coils and the pole piece, between the series and the shunt coils, and between the shunt coils.

2. In a field magnet of a dynamo-electric machine, a pole piece, a series coil, a plurality of concentric shunt coils, and a plurality of spacing blocks, each extending between the pole piece and the series and shunt coils, between the series and shunt coils, and between the concentric shunt coils.

3. In the field magnet of a dynamo-electric machine, a pole piece, a series coil and a plurality of concentric shunt coils on the pole piece, and a plurality of spacing blocks each extending between the concentric shunt coils and between the shunt coils and the series coil and providing ventilating passageways between the coils.

4. In the field magnet of a dynamo-electric machine, a pole piece, a series coil and a plurality of concentric shunt coils on the pole piece, a plurality of spacing blocks each extending between the innermost shunt coil and the pole piece, between the series and shunt coils, and between the concentric shunt coils.

5. In a field magnet of a dynamo-electric machine, a pole piece, a series coil adjacent the armature end of the pole, a superposed shunt coil, a coil seat supporting the series coil, and spacing devices resting on said seat and extending between the pole and series coil and between the series and shunt coils.

6. In a field magnet of a dynamo-electric machine, a pole piece, a pair of concentric coils surrounding the pole piece, and a coil seat surrounding the pole piece at the ends of the coils, said coil seat having projecting portions extending inwardly between the concentric coils and serving to space the same apart to permit a circulation of air between the coils.

7. In a field magnet of a dynamo-electric machine, a pole piece having secured to opposite sides thereof plates having outwardly projecting lugs, a coil surrounding the pole piece, a coil seat surrounding the pole piece at the end of the coil, said coil seat having lugs projecting therefrom, and spacing members between the coil and pole piece and engaging the lugs on the plates and coil seat, whereby the spacing members are retained in position.

In testimony whereof I affix my signature, in the presence of two witnesses.

EMIL MATTMAN.

Witnesses:
 ARTHUR F. KWIS,
 FRED J. KINSEY.